(12) United States Patent
Hucker et al.

(10) Patent No.: US 9,903,589 B2
(45) Date of Patent: Feb. 27, 2018

(54) COMPONENT FOR ATTACHING TO A WALL

(71) Applicant: ROLLS-ROYCE PLC, London (GB)

(72) Inventors: Paul Allan Hucker, Bristol (GB); Alan Philip Geary, Bristol (GB); Anthony John Moran, Renfrewshire (GB); Jonathan Mark Gregory, Gloucestershire (GB)

(73) Assignee: ROLLS-ROYCE plc, London (GB)

( * ) Notice: Subject to any disclaimer, the term of this patent is extended or adjusted under 35 U.S.C. 154(b) by 711 days.

(21) Appl. No.: 14/470,325

(22) Filed: Aug. 27, 2014

(65) Prior Publication Data

US 2015/0082798 A1    Mar. 26, 2015

(30) Foreign Application Priority Data

Sep. 25, 2013 (GB) .................................... 1317006.3

(51) Int. Cl.
*F23R 3/60* (2006.01)
*F23R 3/00* (2006.01)
(Continued)

(52) U.S. Cl.
CPC ............ *F23R 3/002* (2013.01); *F01D 25/145* (2013.01); *F16B 37/048* (2013.01); *F23R 3/007* (2013.01); *F23R 3/60* (2013.01); *F16B 33/002* (2013.01); *F16B 41/002* (2013.01); *F23R 2900/00017* (2013.01); *F23R 2900/00018* (2013.01);
(Continued)

(58) Field of Classification Search
CPC .. F23R 3/002; F23R 3/60; F23R 3/007; F02K 1/80; F16B 5/02; F16B 39/12; F16B 31/021; F16B 39/282; F16B 5/0241; F23M 5/04; F23D 2212/10
See application file for complete search history.

(56) References Cited

U.S. PATENT DOCUMENTS 3,796,125 A * 3/1974 Campbell ........... F16B 19/1072
411/2
4,729,703 A * 3/1988 Sato ....................... F16B 31/021
411/237
(Continued)

FOREIGN PATENT DOCUMENTS

CA        2240801 A1 * 12/1999 ............. F16B 31/021
DE  10 2011 090 000 A1    7/2013
(Continued)

OTHER PUBLICATIONS

Jan. 19, 2015 European Search Report issued in Application No. 14 18 2393.
(Continued)

*Primary Examiner* — Pascal M Bui Pho
*Assistant Examiner* — Kyle Thomas
(74) *Attorney, Agent, or Firm* — Oliff PLC

(57) ABSTRACT

A tile for attaching to a wall of a gas turbine engine. The tile has a main body. The tile also has a bridging structure that projects outwardly from the main body and has a hole configured to receive an elongate fastener so that the tile can be attached to the wall of the gas turbine engine by passing the elongate fastener through a hole in the wall of the gas turbine engine and the hole in the bridging structure.

15 Claims, 4 Drawing Sheets

(51) Int. Cl.
  *F16B 37/04* (2006.01)
  *F01D 25/14* (2006.01)
  *F16B 41/00* (2006.01)
  *F16B 33/00* (2006.01)

(52) U.S. Cl.
  CPC ............... *F23R 2900/00019* (2013.01); *F23R 2900/03041* (2013.01); *F23R 2900/03044* (2013.01)

(56) References Cited

U.S. PATENT DOCUMENTS

| | | | | |
|---|---|---|---|---|
| 4,748,806 | A * | 6/1988 | Drobny | F02K 1/80 403/259 |
| 4,749,298 | A * | 6/1988 | Bundt | F02K 1/82 165/134.1 |
| 4,925,364 | A * | 5/1990 | Das | F01D 17/162 411/183 |
| 5,069,034 | A * | 12/1991 | Jourdain | F02K 1/822 60/752 |
| 6,537,005 | B1 * | 3/2003 | Denham | F16B 19/1054 411/34 |
| 6,857,275 | B2 * | 2/2005 | Pidcock | F23R 3/002 60/752 |
| 2010/0011775 | A1 * | 1/2010 | Garry | C23C 4/02 60/752 |
| 2011/0030378 | A1 * | 2/2011 | Carlisle | F23R 3/002 60/753 |
| 2011/0185740 | A1 * | 8/2011 | Dierberger | F23M 5/02 60/755 |
| 2013/0341460 | A1 * | 12/2013 | Warren | B64D 45/02 244/1 A |

FOREIGN PATENT DOCUMENTS

| | | |
|---|---|---|
| EP | 0 289 443 A2 | 11/1988 |
| EP | 0 843 090 A2 | 5/1998 |
| EP | 0 895 027 A1 | 2/1999 |
| GB | 1183143 | 3/1970 |
| WO | 2009/126534 A1 | 10/2009 |

OTHER PUBLICATIONS

Mar. 19, 2014 Search Report issued in British Application No. GB1317006.3.

* cited by examiner

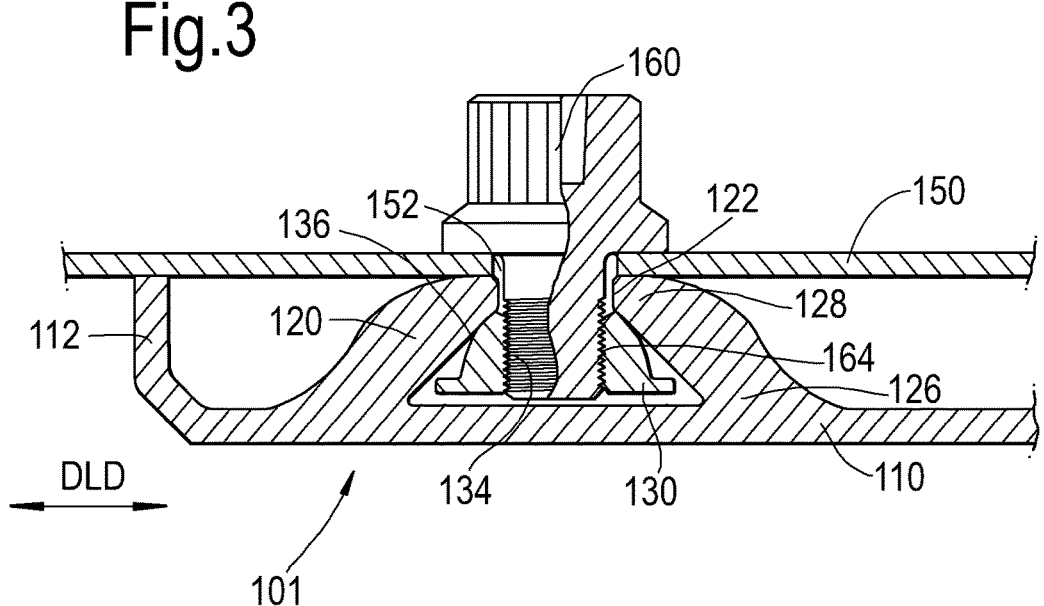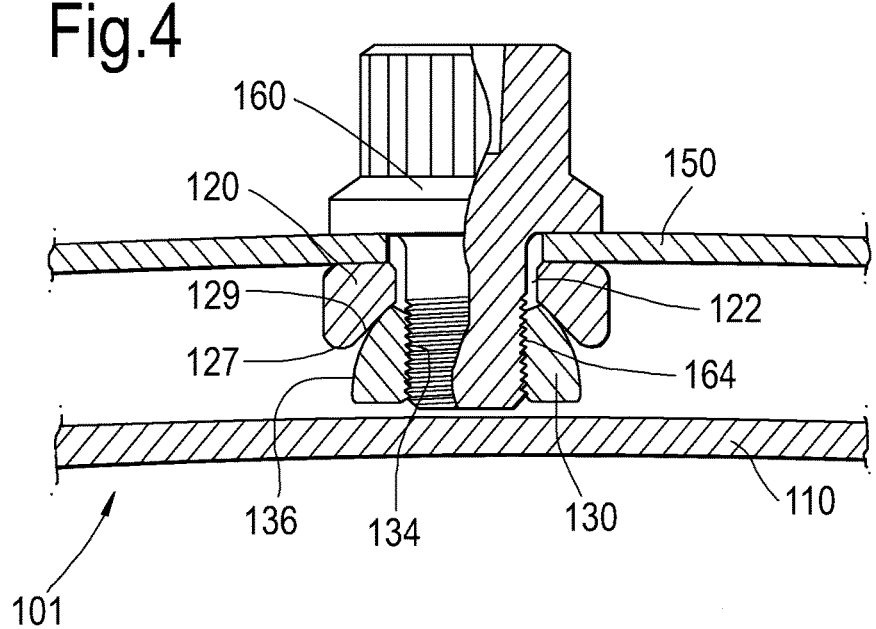

COMPONENT FOR ATTACHING TO A WALL

FIELD OF THE INVENTION

This invention relates to a component for attaching to a wall, and preferably to a tile for attaching to a wall of a gas turbine engine, e.g. to a combustion liner wall.

BACKGROUND OF THE INVENTION

The combustion process in gas turbine engines can peak above 2,100° C. and may typically lie in the region of 1,500° C. or higher. Such temperatures are typically higher than the melting point of the materials used for the walls of combustion chambers.

A typical gas turbine engine has a combustion chamber, which has tiles attached to the inside of a combustion liner wall so that, when the combustion chamber is in use, the tiles face towards the combustion process. Such tiles are typically ceramic coated and pedestal or impingement-effusion cooled, so as keep them at operationally safe temperatures when the combustion chamber is in use.

FIG. 1 shows an example pedestal or impingement-effusion cooled tile 1 attached to a combustion liner wall 50, as in a gas turbine engine made by the present applicant.

As shown in FIG. 1, the pedestal or impingement-effusion cooled tile 1 has an integral stud 60. To attach the pedestal or impingement-effusion cooled tile 1 to the combustion liner wall 50, the stud 60 is passed through a hole in the combustion liner wall 50 and then a nut 30 is screwed onto the stud 60.

The present inventors have observed that, in the arrangement shown in FIG. 1, effective cooling of the stud 60 is difficult to achieve, and overheating of the stud 60 can lead to material creep and loss of tension. Also, as the tile is impingement-effusion cooled, the presence of the stud 60 can disrupt the pattern of the effusion cooling holes which are formed through the tile 1.

The present invention has been devised in light of the above considerations.

SUMMARY OF THE INVENTION

A first aspect of the invention may provide:
a tile for attaching to a wall of a gas turbine engine, wherein the tile has:
a main body; and
a bridging structure that projects outwardly from the main body and has a hole configured to receive an elongate fastener so that the tile can be attached to the wall of the gas turbine engine by passing the elongate fastener through a hole in the wall of the gas turbine engine and the hole in the bridging structure.

An advantage of a tile made in this way is that the tile does not require a stud which extends through the wall of the gas turbine engine, which means that if the tile is heated, components on the other side of the wall from the tile can be protected from overheating.

Also, the bridging structure can be designed so that its footprint on the cooling tile minimises disruption of any cooling mechanism included in the tile, e.g. effusion cooling holes.

Also, the inventors have observed that a tile according to the first aspect of the invention lends itself much better to manufacture using an additive 3D printing method (e.g. laser deposition) compared with the tile 1 shown in FIG. 1, since the tile 1 shown in FIG. 1 has protrusions (e.g. stud 60) that would require support during manufacture by additive 3D printing, adding significantly to cost.

Preferably, the tile includes or is provided with a nut having a threaded hole. Preferably, the threaded hole in the nut is configured to engage with a threaded surface on an elongate fastener, e.g. so that the tile can be attached to a wall of a gas turbine engine by passing the elongate fastener through a hole in the wall of the gas turbine engine and the hole in the bridging structure and screwing the elongate fastener into the nut so as to press the bridging structure against the wall of the gas turbine engine.

Preferably, the nut is joined to the tile via a breakable link prior to the tile being attached to a wall of a gas turbine engine.

Preferably, the breakable link is configured to hold the nut so that the threaded hole in the nut is aligned with the hole in the bridging structure prior to the tile being attached to a wall of a gas turbine engine. In this way, an assembler seeking to attach the tile to a wall of a gas turbine engine can pass an elongate fastener through a hole in the wall of the gas turbine engine and the hole in the bridging structure in the knowledge that the hole in the bridging structure will help to guide the elongate fastener to the threaded hole in the nut, even if that assembler does not have a good view of the tile (e.g. because they are on an opposite side of the wall of the gas turbine engine).

The nut and the breakable link are preferably integrally formed with the tile prior to the tile being attached to a wall of a gas turbine engine, preferably by an additive 3D printing method (such as laser deposition).

Preferably, the breakable link between the nut and the tile is configured to break on application of a predetermined torque and/or axial load between the nut and the tile, e.g. as caused by engagement of the threaded hole in the nut with a threaded surface on an elongate fastener.

Preferably, the nut has a rounded (preferably part spherical, e.g. hemispherical) surface for contacting the bridging structure, e.g. for pressing the bridging structure against the wall of the gas turbine engine. In this way, the tile may be permitted to articulate relative to a wall of a gas turbine engine when the tile is attached to the wall of the gas turbine engine.

Preferably, the nut includes one or more projections (e.g. one or more lugs) which are configured to engage with the bridging structure, e.g. so as to inhibit (more preferably prevent) the nut from spinning freely with respect to the bridging structure.

Equally, the bridging structure may include one or more projections (e.g. one or more lugs) configured to engage with the nut, e.g. so as to inhibit (more preferably prevent) the nut from spinning freely with respect to the bridging structure.

Preferably, the bridging structure is shaped to confine the nut between the bridging structure and the main body of the tile, which can help prevent the nut from accidentally falling away from the tile. This may be particularly easy to implement if the nut and the breakable link are integrally formed with the tile, e.g. by an additive 3D printing method.

The bridging structure may include one or more limbs.

Preferably, the bridging structure, and optionally the nut and breakable link (prior to the tile being attached to a wall of a gas turbine engine), is/are integrally formed with the main body of the tile, e.g. by an additive 3D printing method. More preferably, the bridging structure and main body of the tile are integrally formed with the nut via the breakable link prior to the tile being attached to a wall of a gas turbine engine, e.g. by an additive 3D printing method.

Preferably, the main body of the tile has a ceramic coated surface.

The main body of the tile may be configured to be pedestal or impingement-effusion cooled (e.g. the tile may include a plurality of cooling holes), e.g. in a manner known in the art.

The tile may be for attaching to a wall of a combustion chamber in a gas turbine engine, in which case the tile may be referred to as a combustor tile.

A second aspect of the invention may provide:

a gas turbine engine including:

a wall; and a tile according to the first aspect of the invention;

wherein the tile is attached to the wall of the gas turbine engine by an elongate fastener that passes through a hole in the wall of the gas turbine engine and the hole in the bridging structure of the tile.

The tile may be attached to the wall of the gas turbine engine so that the main body of the tile is located on a side of the wall that, when the gas turbine engine is in use, is hotter than an opposite side of the wall (the opposite side of the wall being the side of the wall on which the main body of the tile is not located). In this way, the tile can serve to protect the wall from high temperatures occurring on the "hotter" side of the wall.

The gas turbine engine may include a combustion chamber, which may include a combustion liner wall.

The wall to which the tile is attached may be the combustion liner wall. The tile may be attached to the combustion liner wall so that the main body of the tile is located on a side of the combustion liner wall that, when the gas turbine engine is in use, is hotter than an opposite side of the combustion liner wall (the opposite side of the wall being the side of the wall on which the main body is not located). For example, the tile may be attached to the combustion liner wall so that, when the combustion chamber is in use, the tiles face towards the combustion process.

The elongate fastener may be a bolt and may include a threaded surface.

The gas turbine engine may include a plurality of the tiles, preferably with each tile being attached to the wall of the gas turbine engine as set out above.

A third aspect of the invention may provide:

A method of making a tile as set out in the first aspect of the invention, wherein the tile is made by an additive 3D printing method, e.g. laser deposition.

A fourth aspect of the invention may provide:

a component for attaching to a wall, wherein the component has:

a main body; and a bridging structure that projects outwardly from the main body and has a hole configured to receive an elongate fastener so that the component can be attached to the wall by passing the elongate fastener through a hole in the wall and the hole in the bridging structure;

wherein the component is provided with a nut having a threaded hole configured to engage with a threaded surface on an elongate fastener, the nut being joined to the component via a breakable link; and wherein the nut and the breakable link are integrally formed with the component.

Such a component would share many of the advantages described in connection with the first aspect of the invention.

The component according to the fourth aspect of the invention may have any feature described in the first aspect of the invention, except that the component need not be a tile and the wall need not be a wall of a gas turbine engine.

For example, the breakable link may be configured to hold the nut so that the threaded hole in the nut is aligned with the hole in the bridging structure prior to the component being attached to a wall.

For example, the nut and the breakable link may be integrally formed with the component by an additive 3D printing method (such as laser deposition).

For example, the nut may have a rounded (preferably part spherical, e.g. hemispherical) surface for contacting the bridging structure.

A fifth aspect of the invention may provide:

An assembly including:

a wall;

a component according to the fourth aspect of the invention;

wherein the component is attached to the wall by an elongate fastener that passes through a hole in the wall and the hole in the bridging structure of the component.

A sixth aspect of the invention may provide:

A method of making a component as set out in the fourth aspect of the invention, wherein the component is made by an additive 3D printing method, e.g. laser deposition.

The invention also includes any combination of the aspects and preferred features described except where such a combination is clearly impermissible or expressly avoided.

BRIEF DESCRIPTION OF THE DRAWINGS

Embodiments of the invention will now be described by way of example with reference to the accompanying drawings in which:

FIGS. 3-8 illustrate an attachment between an example tile and a combustion liner wall of a gas turbine engine.

DETAILED DESCRIPTION AND FURTHER OPTIONAL FEATURES OF THE INVENTION

Figure 2:
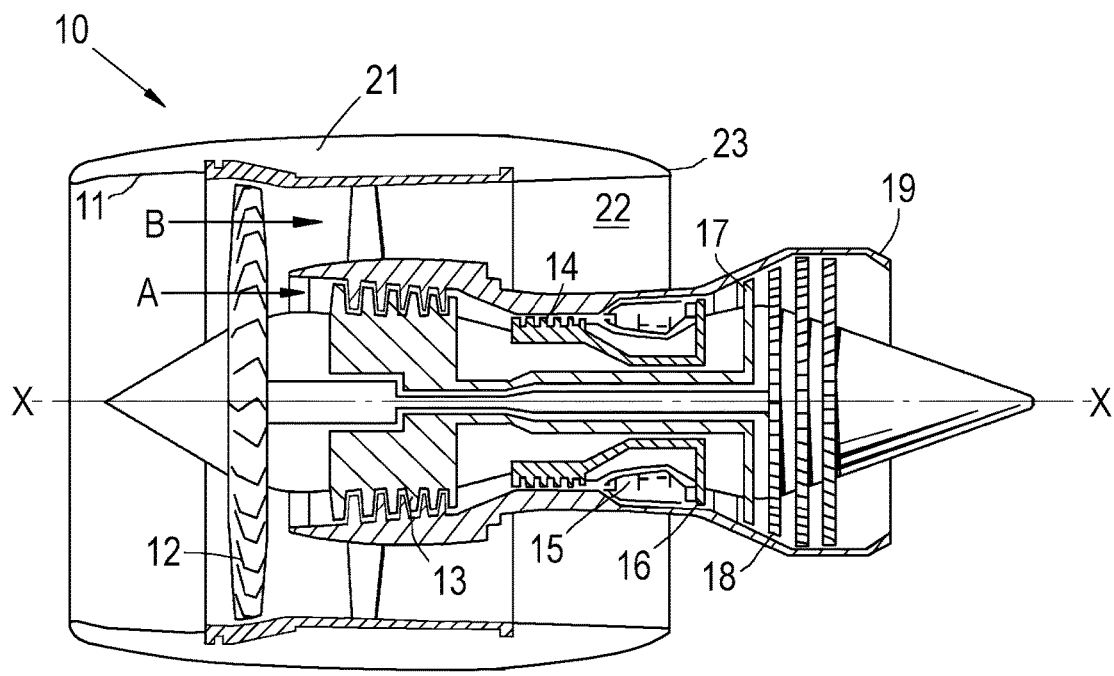
FIG. 2 shows a ducted fan gas turbine engine.

With reference to FIG. 2, a ducted fan gas turbine engine incorporating the invention is generally indicated at 10 and has a principal and rotational axis X-X. The gas turbine engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The combustion equipment 15 may include a combustion chamber, which may include a combustion liner wall.

Preferably, a plurality of tiles are attached to the combustion liner wall so that the main body of each tile is located on a side of the combustion liner wall that, when the gas turbine engine is in use, is hotter than the opposite side of the wall. Preferably, the tiles are attached to the inside of the combustion liner wall so that, when the combustion chamber is in use, the main body of each tile faces towards the combustion process.

FIGS. 3-6 illustrate an attachment between an example tile 101 and a combustion liner wall 150 of a gas turbine engine.

In more detail, FIG. 3 is a cross section through the attachment between the tile 101 and the combustion liner wall 150, as taken along the direction thought to be the most economical direct laser deposition ("DLD") build direction. In this particular arrangement the cross section is in a plane containing the rotational axis X-X of the gas turbine engine 10.

FIG. 4 is a cross section through the attachment between the tile 101 and the combustion liner 150, as taken along a direction perpendicular to the direction thought to be the most economical DLD build direction. In this particular arrangement the cross section is in a plane perpendicular to the rotational axis X-X of the gas turbine engine 10.

Figure 5:
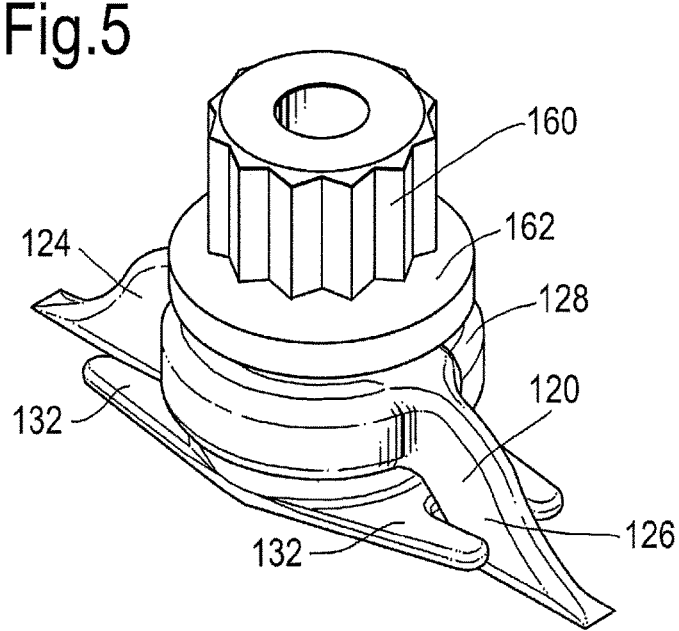
Figure 6:
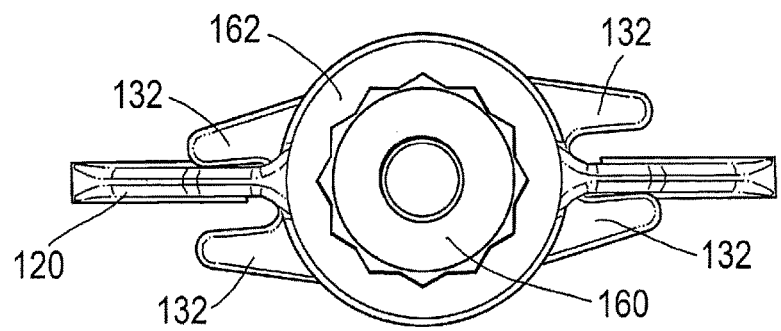

FIGS. 5-6 are perspective views in which the main body 110 of the tile 101 and the combustion liner wall 150 are omitted for clarity.

As shown in FIGS. 3, 4, 7, and 8, the tile 101 has a main body 110, having the general form of an ordinary tile. The tile 101 may also have a fence 112, e.g. to stop cooling air from leaking into the combustion chamber. Typically, there would be a gap in the order of 1 mm between the fences of adjacent tiles 101 mounted to the combustion liner wall 150 (not shown).

As shown most clearly in FIGS. 3 and 5, the tile 101 also has a bridging structure 120 that projects outwardly from the main body 110.

Preferably, the bridging structure 120 has a hole 122 configured to receive an elongate fastener 160, which in this example is a bolt, so that the tile 101 can be attached to the combustion liner wall 150 by passing the elongate fastener 160 through a hole 152 in the combustion liner wall 150 of the gas turbine engine 10 and the hole 122 in the bridging structure 120, e.g. in a manner that will be described in more detail below.

As shown in FIG. 5, the bridging structure 120 has two limbs 124 and 126 which link the bridging structure 120 with the main body 110 of the tile 101. The two limbs 124 and 126 support a ring structure 128 which accommodates the hole 122 in the bridging structure 120.

The limbs 124 and 126 are coplanar and arranged in a plane containing the rotational axis X-X of the gas turbine engine 10.

Preferably, the tile 101 includes or is provided with a nut 130 having a threaded hole 134 that is configured to engage with a threaded surface 164 on the elongate fastener 160. Preferably, the nut 130 has a rounded (preferably part spherical, e.g. hemispherical) surface 136 for contacting an under surface, 129 of the a part spherical under surface, of the ring structure 128 of the bridging structure 130, e.g. for pressing the bridging structure 120 against the combustion liner wall 150, whilst permitting the tile 101 to articulate relative to the combustion liner wall 150.

Preferably, the nut 130 includes one or more lugs 132 which are configured to engage with the limbs 124 and 126 of the bridging structure 120, e.g. so as to inhibit (more preferably prevent) the nut 130 from spinning freely with respect to the bridging structure 120. Thus, the lug(s) 132 can be viewed as providing an "anti-rotation" feature. In this example, there are four lugs 132 (see e.g. FIG. 6) which are designed to permit very little rotation of the nut 130 relative to the tile 101 (e.g. to permit no more than 4-5° of rotation), so as to permit the engagement between the elongate fastener 160 and the nut 130 to be tightened to a desired torque, e.g. as described below in more detail.

The nut 130 and lug(s) 132 are preferably designed to be built by direct laser deposition (or another additive 3D printing manufacturing method), i.e. so that the nut 130 is an integral part of the component being built (which in this case, is a tile 101).

Figure 7:
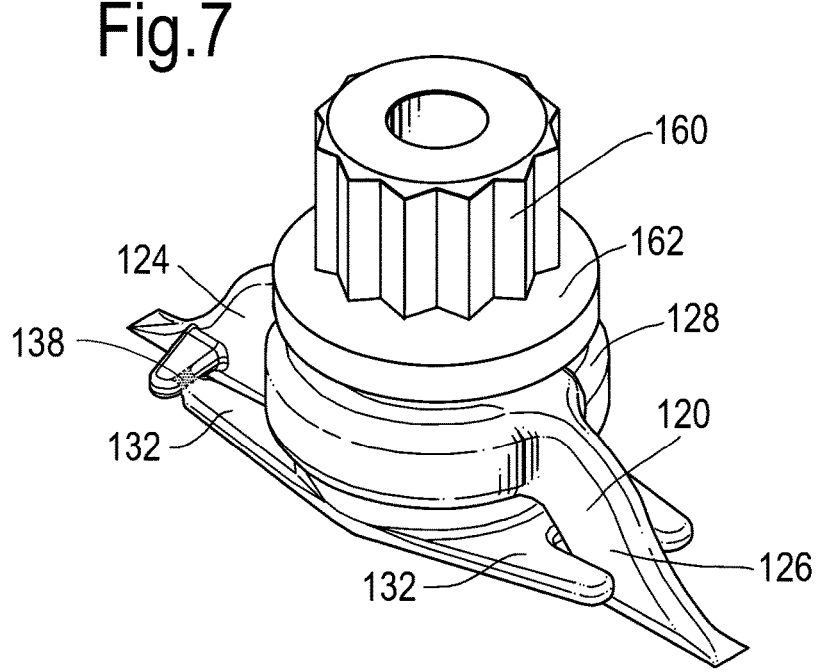
Figure 8:
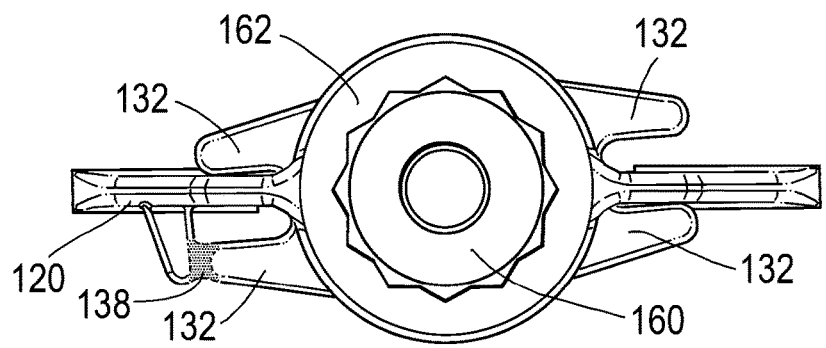

Preferably, the nut 130 is joined to the tile 101 via a breakable link 138, as shown in FIGS. 7 and 8, that is configured to hold the nut 130 so that the threaded hole 134 in the nut 130 is aligned with the hole 122 in the bridging structure 120 prior to the tile 101 being attached to the combustion liner wall 150. The breakable link preferably breaks during attachment of the tile 101 to the combustion liner wall 150.

The nut 130 and the breakable link are preferably integrally formed with the tile 101, e.g. by an additive 3D printing method (such as laser deposition). Thus, the main body 110 of the tile 101, the bridging structure 120, the nut 130 and the breakable link are manufactured as a single piece, a unitary piece, by a 3D printing method. The direction thought to be the most economical direct laser deposition ("DLD") build direction is labelled "DLD" in FIG. 3. Note that the breakable link (which may be thought of as a "wear link") may act as a support structure for the nut 130 during the additive 3D printing method.

The tile 101 can be attached to a combustion liner wall 150 by passing the elongate fastener 160, which in this example is a bolt, through a hole 152 in the combustion liner wall 150 and the hole 122 in the bridging structure 120. Because the breakable link is configured to hold the nut 130 so that the threaded hole 134 in the nut 130 is aligned with the hole 122 in the bridging structure 120, the bridging structure 120 is able to help guide the elongate fastener 160 to the threaded hole 134 in the nut 130 as the elongate fastener 160 is passed through the hole 152 in the combustion liner wall 150 and the hole 122 in the bridging structure 120, thereby guiding the elongate fastener 160 as it is screwed into the nut 130, e.g. by turning the head of the elongate fastener 160 using a wrench. Continued tightening of the elongate fastener 160 preferably causes the breakable link to break (the breakable link may be configured so that this occurs at a predetermined torque and/or axial load between the nut 130 and the tile 101).

After the breakable link has broken, the engagement between the elongate fastener 160 and the nut 130 can be tightened to a desired torque, e.g. by continued turning the head of the elongate fastener 160 using a wrench, since the lugs 132 on the nut preferably prevent the nut 130 from spinning freely with respect to the bridging structure 120.

Note that once the breakable link has broken, the tile 101 is able to articulate relative to the combustion liner wall 150 by means of the rounded surface 136 on the nut 130.

The articulation permitted between the tile 101 and combustion liner wall 150 need not be great, e.g. it may be in the region of 2-3°. However, this articulation can be very helpful in installing a plurality of the tiles 101 on the combustion liner wall 150 by allowing the tile 101 to compensate for imperfections/distortions in the shape of the combustion liner wall 150 and/or the tile 101. Articulation can also help to reduce local stresses, e.g. as caused by thermal loading when the gas turbine engine is in use.

A washer 162, in this case an extended washer, may be incorporated in the head of the elongate fastener 160, e.g. to distribute the load of the elongate fastener 160 on the combustion liner wall 150.

As noted above, the nut 130 preferably include lug(s) 132 that may stop the nut 130 spinning freely, preferably whilst still allowing articulation between the tile 101 and the combustion liner wall 150. However, although the anti-rotation is provided in this example by lug(s) 132, other means of achieving this anti-rotation feature could easily be envisaged by a skilled person.

The nut 130 may incorporate a "self-locking" oval. This may involve the threaded hole 134 in the nut 130 including an oval portion at one end for locking the nut onto the elongate fastener 160 as is known in the art. Equally, "self-locking" between the nut 130 and the elongate fastener 160 could be achieved by other means.

Preferably, the bridging structure 120 is shaped and dimensioned to confine the nut 130 between the bridging structure 120 and the main body 110 of the tile 101, which can help prevent the nut 130 from accidentally falling away from the tile 101. In this way, the bridging structure 120 can be seen as providing a "nut retention" feature.

Preferably, the four lugs 132 are arranged in two pairs and each pair of lugs 132 is arranged so that an associated limb 124, 126 is positioned between the pair of lugs 132 to facilitate the engagement between the elongate fastener 160 and the nut 130 to be tightened to a desired torque as described above. This arrangement also helps to prevent the nut 130 from accidentally falling away from the tile 101.

The nut 130 preferably has an axial length greater than the distance between the surface 127 of the ring structure 128 facing the main body 110 of the tile 101 and the surface of the main body 110 of the tile 101 also to prevent the nut from accidentally falling away from the tile 101. The surface 127 of the ring structure 128 is nearer to the main body 110 of the tile 101 than the part spherical surface 129 of the ring structure 128 and thus as seen in FIG. 4 the nut 130 extends axially part way into the ring structure 128 so that one axial end of the nut 130 is positioned between the axial ends of the ring structure 128.

An advantage of using an additive 3D printing method to make the tile 101 (see above) is that tile 101 can be made with the nut 130 being pre-located within a bridging structure 120 shaped to confine the nut 130 between the bridging structure 120 and the main body 110 of the tile 101, i.e. so that it is not necessary to find a way to locate the nut 130 between the bridging structure 120 and the main body 110 of the tile 101.

The tile 101 may include effusion cooling holes (not illustrated), e.g. to allow cooling air to flow into the combustion chamber through the effusion cooling holes, as is known in the art.

Figure 1:
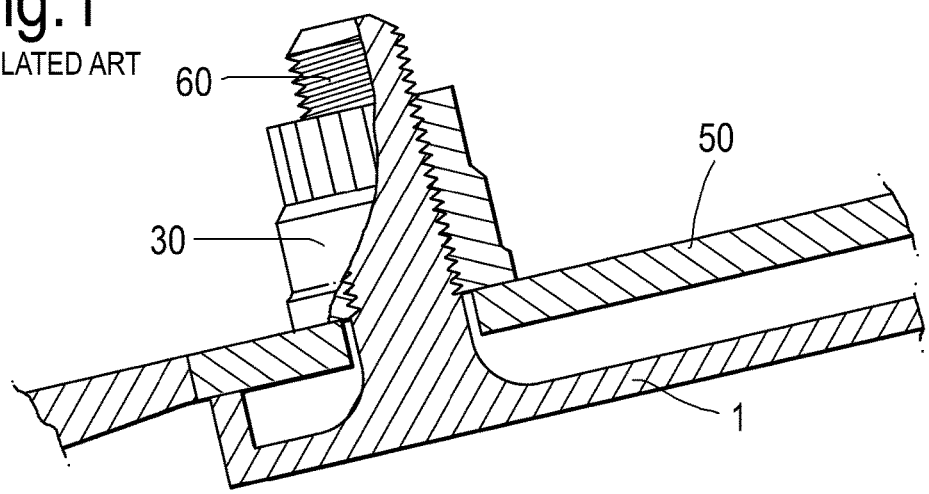
FIG. 1 an example pedestal or impingement-effusion cooled tile attached to a combustion liner wall, as in a gas turbine engine made by the present applicant.

Preferably, if the tile incorporates effusion cooling holes, the bridging structure 120 is configured to have a footprint on the main body 110 of the tile 101 that reduces the disruption of the tile's effusion cooling hole pattern compared with the disruption caused by the stud 60 shown in FIG. 1. In this example, the bridging structure 120 has been designed to have a long and thin footprint, e.g. the bridging structure 120 is axially long in the longitudinal, axial, direction and thin in the circumferential direction, which is designed to fit in with an effusion cooling hole pattern.

Advantages of the attachment between the tile 101 and the combustion liner wall 150 shown in FIGS. 3-6 compared with that shown in FIG. 1 include:

In use, as the retaining bolt 160 is not directly connected to the hot tile 101, it should have reduced temperatures compared with the stud 60 of FIG. 1, and should therefore have reduced risk of creep;

The attachment permits flexibility/articulation between the tile 101 and the combustion liner wall 150;

If the tile 101 includes cooling holes, the bridging structure 120 can be designed to optimise the cooling-air flow for improved thermal management;

The tile can be built using 3D printing methods much more economically than the tile of FIG. 1

Although the invention has been described with respect to a tile for attaching to a wall of a gas turbine engine, the same principles can equally be applied to any component for attaching to any wall, since many benefits of the invention (e.g. reducing the number of assembly operations required to attach the component to a wall, removing the need for captive fasteners) can be achieved even if the component was not a tile and the wall was not a combustion liner wall.

Thus, the invention may find applicability in any blind assembly where the component is to be manufactured by direct laser deposition (or another additive 3D printing manufacturing technique) and/or is required to articulate relative to a wall. Note that with the nut integrated into the component, an assembly step of adding the nut can be avoided regardless of the nature of the component.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

The invention claimed is:

1. A component for attaching to a wall, wherein the component comprising:
   a main body;
   a bridging structure projecting outwardly from the main body, the bridging structure having a bridging structure hole configured to receive an elongated fastener, and the component being attached to the wall by passing the elongated fastener through a wall hole in the wall and the bridging structure hole in the bridging structure; and a nut joined to the component via a breakable link and having a threaded hole configured to engage with a threaded surface on the elongated fastener, the bridging structure, the nut, and the breakable link being integrally formed by an additive 3D printing method with the component.

2. The component according to claim 1, wherein the breakable link is configured to hold the nut so that the threaded hole in the nut is aligned with the bridging structure hole in the bridging structure prior to the component being attached to the wall.

3. The component according to claim 1, wherein the nut and the breakable link are integrally formed with the component by the additive 3D printing method prior to the component being attached to the wall.

4. The component according to claim 1, wherein the breakable link between the nut and the component is configured to break on application of a predetermined torque and/or axial load between the nut and the component.

5. The component according to claim 1, wherein the nut has a part spherical surface to contact the bridging structure.

6. The component according to claim 1, wherein the nut includes one or more projections configured to engage with the bridging structure so as to prevent the nut from spinning freely with respect to the bridging structure.

7. The component according to claim 1, wherein the bridging structure is shaped to confine the nut between the bridging structure and the main body of the component.

8. The component according to claim 1, wherein the bridging structure includes a ring structure and two limbs, the two limbs projecting outwardly from the main body to support the ring structure, and the ring structure defining the hole in the bridging structure.

9. The component according to claim 8, wherein the nut has an axial length greater than a distance between a surface of the ring structure facing the main body of the component and a surface of the main body of the component.

10. A tile for attaching to a wall of a gas turbine engine, the tile comprising:

a main body; and a bridging structure projecting outwardly from the main body, the bridging structure having a bridging structure hole configured to receive an elongated fastener, the tile being attached to the wall of the gas turbine engine by passing the elongated fastener through a wall hole in the wall of the gas turbine engine and the bridging structure hole in the bridging structure; and a nut joined to the tile via a breakable link and having: (i) a threaded hole configured to engage with a threaded surface on the elongated fastener, and (ii) a part spherical surface to contact the bridging structure, the bridging structure, the nut and the breakable link being integrally formed by an additive 3D printing method with the tile.

11. The tile according to claim 10, wherein the main body of the tile has a ceramic coated surface and/or is configured to be pedestal or impingement cooled.

12. The tile according to claim 10, wherein the tile is attached to a wall of a combustion chamber in the gas turbine engine.

13. A method of making the tile according to claim 10, wherein the additive 3D printing method is laser deposition.

14. A gas turbine engine comprising:

a wall of the gas turbine having a wall hole; and a tile attached to the wall of the gas turbine engine, the tile including:

a main body;

a bridging structure projecting outwardly from the main body, the bridging structure having a bridging structure hole configured to receive an elongated fastener; and a nut joined to a component via a breakable link and having a threaded hole configured to engage with a threaded surface on the elongated fastener, the nut having a part spherical surface to contact the bridging structure, wherein:

the tile is attached to the wall of the gas turbine engine by the elongated fastener that passes through the wall hole in the wall of the gas turbine engine, through the bridging structure hole in the bridging structure of the tile, and engages the threaded surface of the nut; and the bridging structure, the nut, the breakable link, and the tile are a unitary piece formed by an additive 3D printing method.

15. The turbine engine according to claim 14, further comprising a combustion chamber having a combustion liner wall, wherein the wall to which the tile is attached is the combustion liner wall.

* * * * *